US006894739B2

(12) United States Patent
Sung et al.

(10) Patent No.: US 6,894,739 B2
(45) Date of Patent: May 17, 2005

(54) DISPLAY APPARATUS HAVING SNAP PIN REINFORCING MEMBER FASTENING MECHANISM

(75) Inventors: Ki-hyub Sung, Suwon (KR); Seon-woo Lim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 10/331,512

(22) Filed: Dec. 31, 2002

(65) Prior Publication Data

US 2003/0227581 A1 Dec. 11, 2003

(30) Foreign Application Priority Data

Jun. 11, 2002 (KR) .......................................... 2002-32663

(51) Int. Cl.⁷ ............................................. G02F 1/1333
(52) U.S. Cl. .............................. 349/58; 349/59; 349/60; 361/681
(58) Field of Search ....................... 349/58–60; 361/681

(56) References Cited

U.S. PATENT DOCUMENTS

| | | |
|---|---|---|
| 5,146,390 A | 9/1992 | Wong |
| 5,450,221 A | 9/1995 | Owen et al. |
| 5,479,285 A | 12/1995 | Burke |
| 5,946,062 A | 8/1999 | Hasegawa et al. |
| 6,195,148 B1 * | 2/2001 | Sasuga et al. ............... 349/149 |
| 6,256,075 B1 | 7/2001 | Yang |
| 6,392,723 B1 * | 5/2002 | Sugiyama et al. ............. 349/58 |
| 6,411,352 B1 * | 6/2002 | Kim .............................. 349/58 |
| 6,507,377 B1 * | 1/2003 | Jung ............................ 349/60 |

FOREIGN PATENT DOCUMENTS

| | | |
|---|---|---|
| EP | 1 150 199 | 10/2001 |
| GB | 2 336 708 | 10/1999 |
| KR | 10-176185 | 11/1998 |
| KR | 20-0142072 | 1/1999 |
| KR | 2001-108908 | 12/2001 |
| KR | 10-322893 | 1/2002 |
| KR | 20-285944 | 8/2002 |

* cited by examiner

Primary Examiner—Tarifur R. Chowdhury
Assistant Examiner—Michael H. Caley
(74) Attorney, Agent, or Firm—Staas & Halsey LLP

(57) ABSTRACT

A display apparatus having an LCD panel, a front cover covering a front edge of the LCD panel, a panel supporting member connected to the front cover, with the LCD panel being disposed therebetween, and a rear cover disposed in back of the panel supporting member and connected to the front cover. The display also includes a first snap pin protruding from the rear of the front cover and having a first projection holder, a reinforcing member formed with an opening and having a projection engaging with the first projection holder of the first snap pin, and a flange part formed on the panel supporting member and having a first projection engaging with the opening of the reinforcing member. With this configuration, a display apparatus can be assembled or disassembled in relatively short time, has a slim and compact appearance, and has an improved EMI shielding effect.

17 Claims, 8 Drawing Sheets

US 6,894,739 B2

DISPLAY APPARATUS HAVING SNAP PIN REINFORCING MEMBER FASTENING MECHANISM

CROSS-REFERENCE TO RELATED APPLICATIONS

This application claims the benefit of Korean Application No. 2002-32663, filed Jun. 11, 2002, in the Korean Intellectual Property Office, the disclosure of which is incorporated herein by reference.

BACKGROUND OF THE INVENTION

1. Field of the Invention

The present invention relates to a display apparatus, and more particularly, a display apparatus improved in a panel supporting member supporting an LCD (liquid crystal display), a front cover, and a rear cover.

2. Description of the Related Art

As illustrated in FIGS. 1 and 2, a conventional display apparatus comprises a front cover 112 and a rear cover 127 connected to the front cover 112 and forming a predetermined accommodating space, an LCD panel 140 having an effective surface on which a picture is displayed, a panel supporting member 142 supporting the LCD panel 140, and a PCB (printed circuit board) assembly 144 supported by a PCB cover 146 and transmitting an electric signal to the LCD panel 140.

The front cover 112 includes a front part 114 formed with a display opening 116 through which the effective surface of the LCD panel 140 is exposed externally, and a skirt part 117 extending from each edge of the front part 114 and bending toward the rear cover 127.

The rear of the front cover 112 is provided with a plurality of first bosses 118 formed with screw threads thereinside, respectively, so that first screws 135 are fastened to the first bosses 118 through first through holes 133 formed on the rear cover 127. Further, in positions spaced from the first bosses 118 are provided a plurality of second bosses 120 formed with screw threads therein, respectively, so that second screws 141 are fastened to the second bosses 120 through second through holes 145 formed on flange parts 143 of the panel supporting member 142.

With this configuration, the conventional display apparatus is assembled as follows.

First, the LCD panel 140 is connected to the panel supporting member 142 with the effective surface thereof being disposed toward the front cover 112, and then the second through holes 145 each formed on the flange parts 143 of the panel supporting member 142 are brought to the second bosses 120 formed on the inside of the front cover 112, respectively. Thereafter, the second screws 141 are each fastened to the second bosses 120 through the second through holes 145, so that the panel supporting member 142 and the front cover 112 are connected to each other, putting the LCD panel 140 therebetween.

After connecting the front cover 112 and the panel supporting member 142, the PCB assembly 144 is mounted on the panel supporting member 142 and electrically connected to the LCD panel 140. Thereafter, the PCB assembly 144 is covered with the PCB cover 146.

Thereafter, the first through holes 133 formed on the rear cover 127 are brought to the first bosses 118 formed on the front cover 112, and then the first screws 135 are fastened to the first bosses 118 through the first through holes 133, thereby assembling the conventional display apparatus completely.

However, the conventional display apparatus employs screws to connect the front cover 112 and the rear cover 127 as well as the front cover 112 and the panel supporting member 142, so that it is inconvenient to assemble the display apparatus. Further, in the conventional display apparatus, the PCB cover 146, accommodating the PCB assembly 144, is separated from the panel supporting member 142, so that not only does it take a considerable amount of time to assemble the display apparatus, but also the cost of the material is high.

Further, in order to connect the panel supporting member 142 and the front cover 112, the panel supporting member 142 should be formed with the flange part 143, and therefore the front part 114 of the front cover 112 should have a width "B" wide enough to accommodate the flange part 143.

Further, the conventional display apparatus cannot sufficiently block electromagnetic interference (EMI) generated from the PCB assembly 144.

SUMMARY OF THE INVENTION

Accordingly, it is an object of the present invention to provide a display apparatus which can be assembled or disassembled in a relatively short period of time, and has a slim and compact appearance.

Another object of the present invention is to provide a display apparatus which has a high EMI shielding effect.

Additional objects and advantages of the invention will be set forth in part in the description which follows and, in part, will be obvious from the description, or may be learned by practice of the invention.

The foregoing and other objects of the present invention are achieved by providing a display apparatus comprising an LCD panel, a front cover covering a front edge of the LCD panel, a panel supporting member connected to the front cover, with the LCD panel being disposed therebetween, and a rear cover disposed in back of the panel supporting member and connected to the front cover, the display apparatus further comprising: a first snap pin protruding from the rear of the front cover and having a first projection holder; a reinforcing member formed with an opening and having a projection engaging with the first projection holder of the first snap pin; and a flange part formed on the panel supporting member and having a first projection engaging with the opening of the reinforcing member.

In an aspect of the present invention, the reinforcing member is made of a conductive material.

In another aspect of the present invention, the reinforcing member includes a ground part having a first surface in contact with the rear surface of the front cover and a second surface in contact with the panel supporting member; a reinforcing part bent from the ground part and extending parallel to the first snap pin; and a rib formed at opposite sides of the reinforcing part, wherein the projection and the opening of the reinforcing member are provided in the reinforcing part, respectively.

In yet another aspect of the present invention, the first snap pin includes a rib holder engaging with the rib of the reinforcing member to prevent the reinforcing member from breaking away.

In yet another aspect of the present invention, the first projection of the flange part includes a snap hook manufactured by press-machining the flange part.

In yet another aspect of the present invention, the panel supporting member includes a supporting projection supporting the LCD panel.

In yet another aspect of the present invention, the panel supporting member is formed with a predetermined housing accommodating a PCB assembly communicating an electric signal with the LCD panel.

In yet another aspect of the present invention, the display apparatus further includes a second snap pin protruding from the rear of the front cover at a distance from the first snap pin and having a second projection holder; and a second projection formed on the rear cover and engaging with the second projection holder of the second snap pin.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE PREFERRED EMBODIMENT

Figure 1:
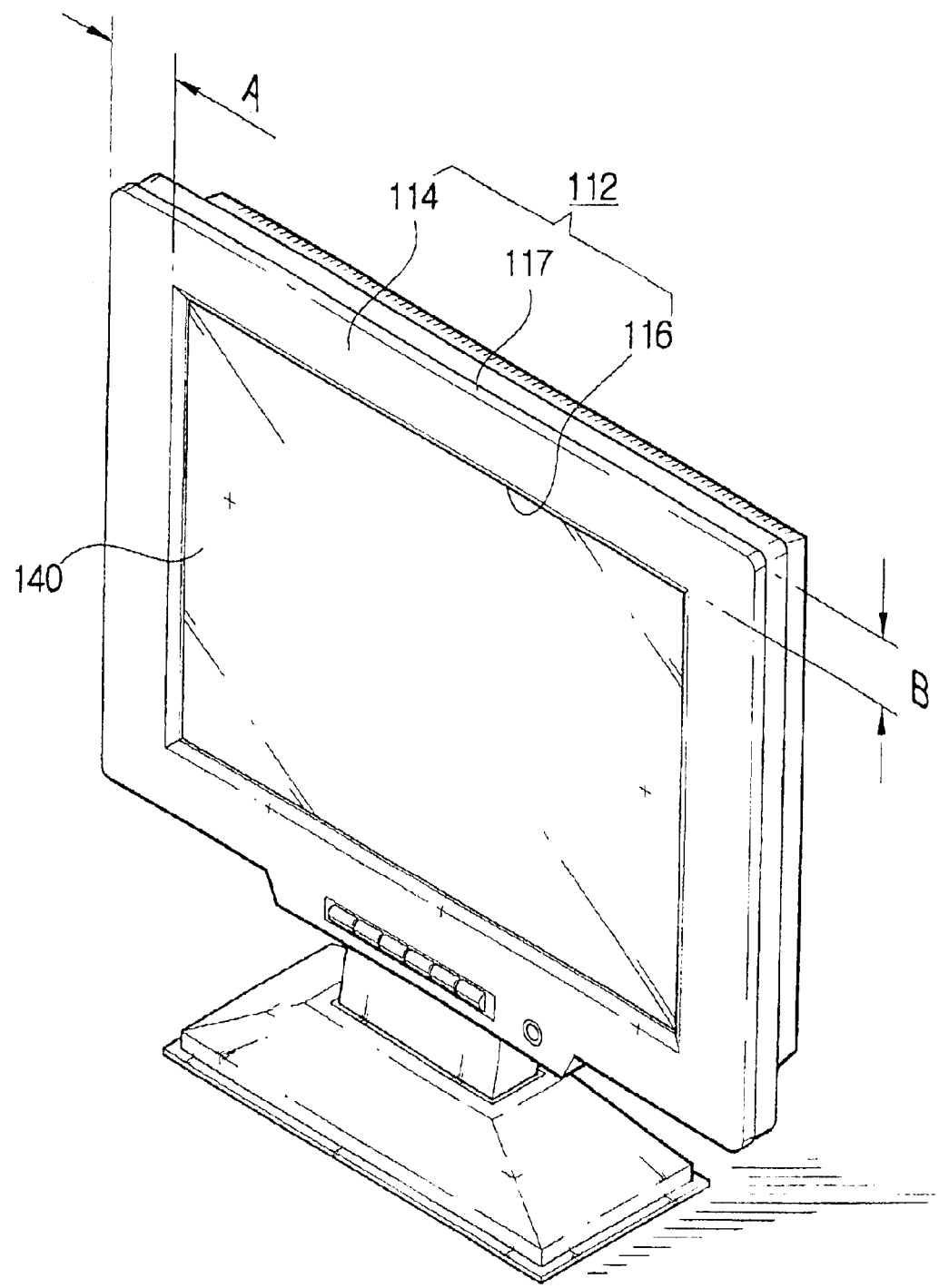
FIG. 1 is a perspective view of a conventional display apparatus.
Figure 2:
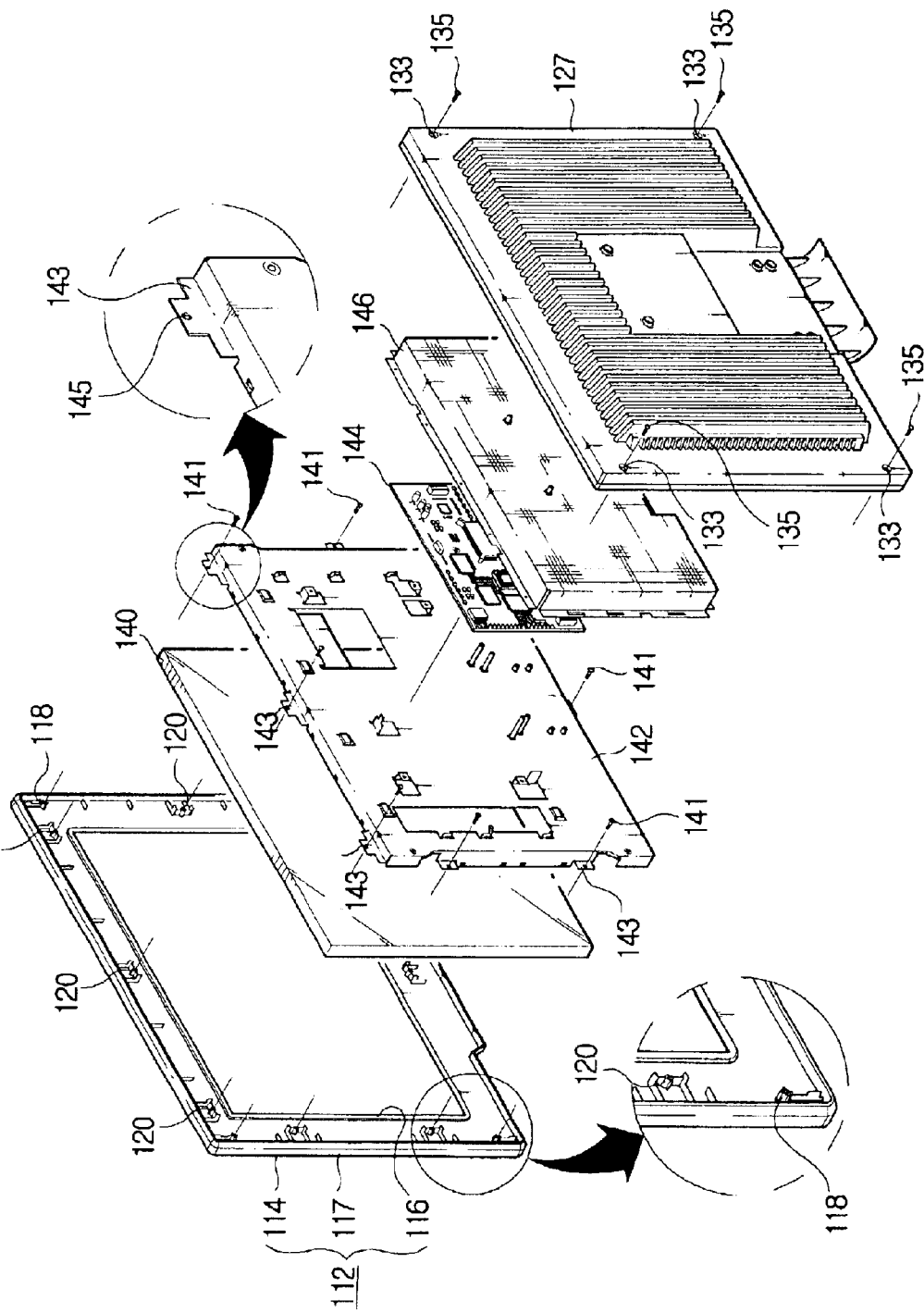
FIG. 2 is an exploded perspective view of a conventional display apparatus.
Figure 3:
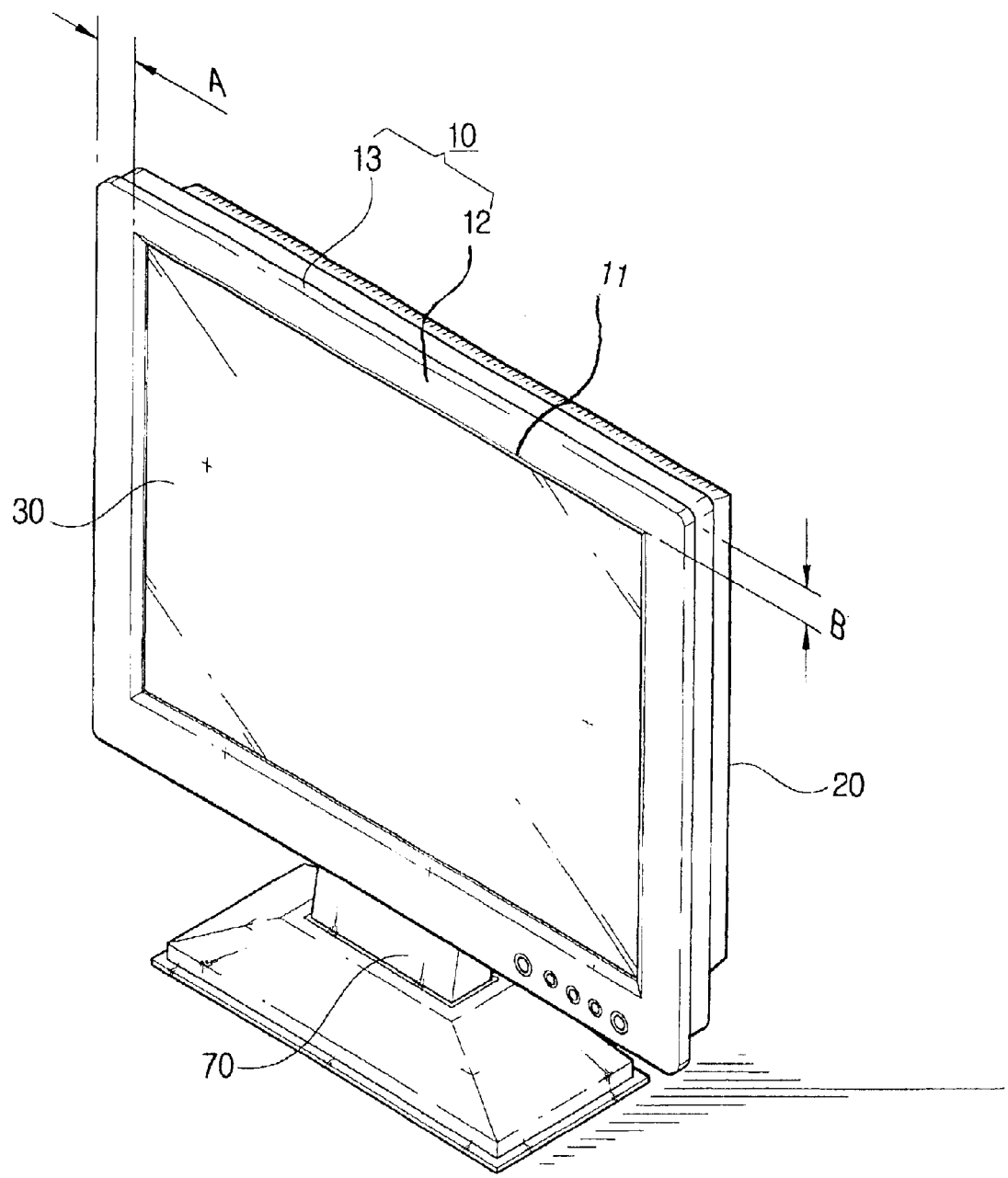
FIG. 3 is a perspective view of a display apparatus according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

As illustrated in FIGS. 3 through 6, a display apparatus according to an embodiment of the present invention comprises an LCD panel 30, a PCB assembly 60 communicating an electric signal with the LCD panel 30, a front cover 10 covering the front edge of the LCD panel 30, a panel supporting member 40 connected to the front cover 10, with the LCD panel 30 and the PCB assembly 60 being disposed therebetween, a rear cover 20 connected to the front cover 10 behind the panel supporting member 40, and a stand 70 supporting the assembled components 10, 20, 30, 40 and 60.

The LCD panel 30 displays a picture thereon according to the principle that a molecular arrangement of a liquid crystal is scattered by voltage supplied by the PCB assembly 60, to thereby polarize light. Hereinafter, the front part of the LCD panel 30, which is exposed externally through the front cover 10 and displays a picture thereon, will be called an effective surface.

The front cover 10 includes a front part 12 formed with a display opening 11 through which the effective surface of the LCD panel 30 is exposed externally, and a skirt part 13 extending from each edge of the front part 12 and bent toward the rear cover 20. Herein, the front part 12 partially covers the edge of the effective surface of the LCD panel 30.

Figure 4:
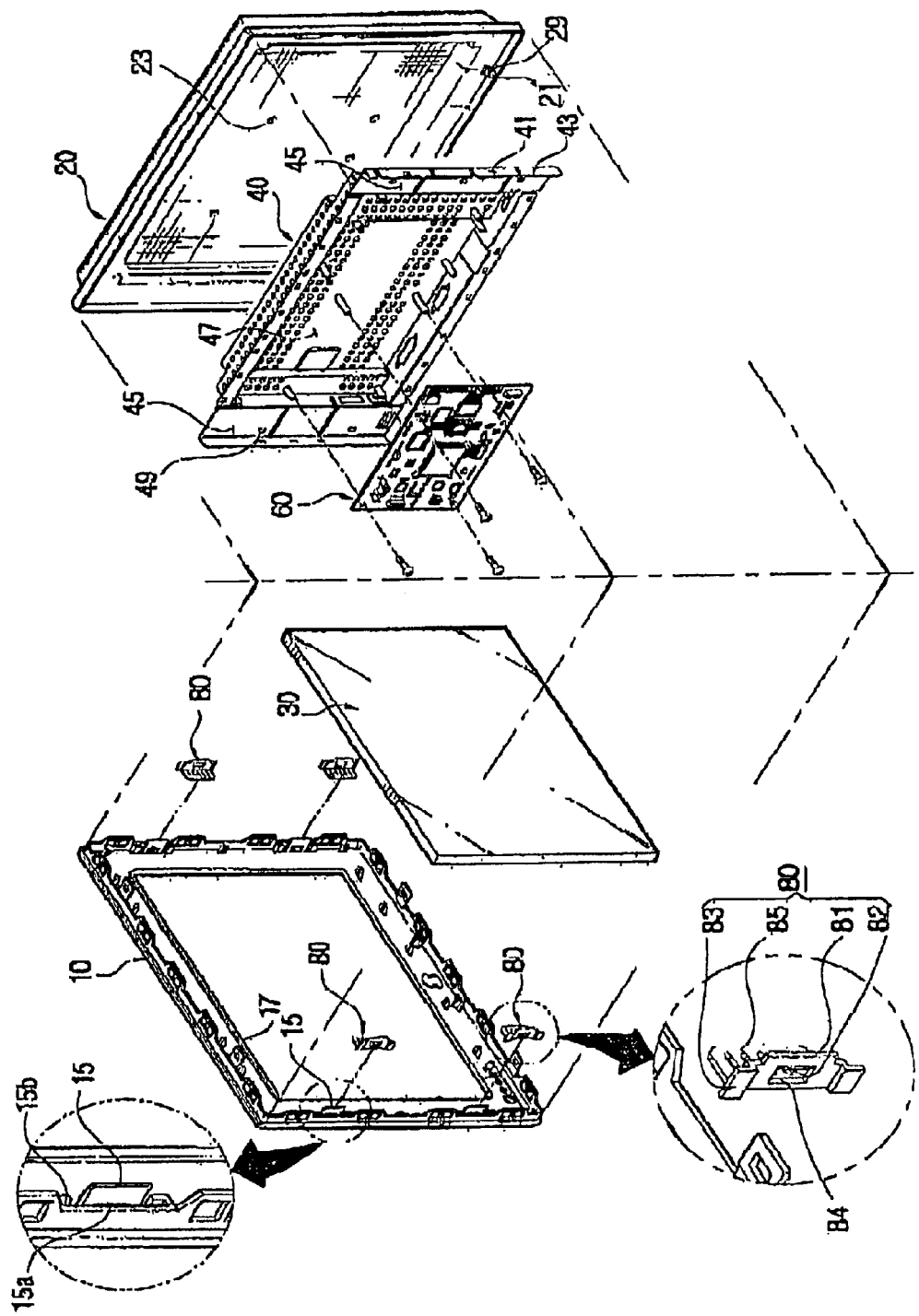
FIG. 4 is an exploded perspective view of the display apparatus of FIG. 3.

As illustrated in FIG. 4, the rear of the front cover 10 is provided with a plurality of first snap pins 15 protruding therefrom toward the panel supporting member 40 to be fastened to the panel support member 40, and a plurality of second snap pins 17 protruding therefrom toward the rear cover 27 to be fastened to the rear cover 27.

The first snap pin 15 is provided with a projection holder 15a and engages with a projection 82 provided in a reinforcing member 80 (to be described later), and a rib holder 15b is provided adjacent to opposite sides of the first snap pin 15 and engages with a rib 83 of the reinforcing member 80 to prevent the reinforcing member 80 from breaking away. In the present embodiment, the projection holder 15a is formed of a slot formed transversely to a lengthwise direction of the first snap pin 15. Alternatively, the projection holder 15a may have various shapes to be engaged with the projection 82 of the reinforcing member 80.

The reinforcing member 80 includes a ground part 85 contacting the front cover 10, the reinforcing member 80 being formed with a reinforcing part 81 and an opening 84, bent from the ground part 85 and extending parallel to the first snap pin 15, and the rib 83 extending from the opposite sides of the reinforcing part 81 and engaging with the rib holder 15b so as to prevent the reinforcing member 80 from a breaking away.

The reinforcing part 81 is provided with the projection 82 inserted to the projection holder 15a of the first snap pin 15, so that the reinforcing member 80 is not only prevented from breaking away but also is reinforced. Further, the reinforcing part 81 is made of a conductive material, and grounds the panel supporting member 40, thereby shielding electromagnetic waves generated by the PCB assembly 60, i.e., accomplishing an EMI shielding effect.

The ground part 85 has a first surface being in contact with the inside of the front cover 10, and a second surface being in contact with the panel supporting member 40. Like the reinforcing part 81, the ground part 85 is also made of a conductive material, thereby accomplishing the EMI shielding effect. In other words, the reinforcing member 80 functions not only to reinforce the first snap pin 15 but also to accomplish the EMI shielding effect.

The panel supporting member 40, connected to the front cover 10, with the LCD panel 30 being disposed therebetween, comprises a flange part 43 forwardly bent, and a projection 41 formed in the flange part 43 and engaging with the opening 84 of the reinforcing member 80, and forms a panel housing 45 to house the LCD panel 30. Further, the inside of the panel housing 45 is formed with a PCB housing 47 for housing the PCB assembly 60, thereby facilitating an electrical connection between the LCD panel 30 and the PCB assembly 60, and allowing the display apparatus to be easily assembled and disassembled. Furthermore, the panel supporting member 40 is provided with a supporting projection 49 on the inside surface thereof and facing toward the LCD panel 30, so that the LCD panel 30 is closely supported by the panel supporting member 40 and prevented from becoming loose.

Figure 5:
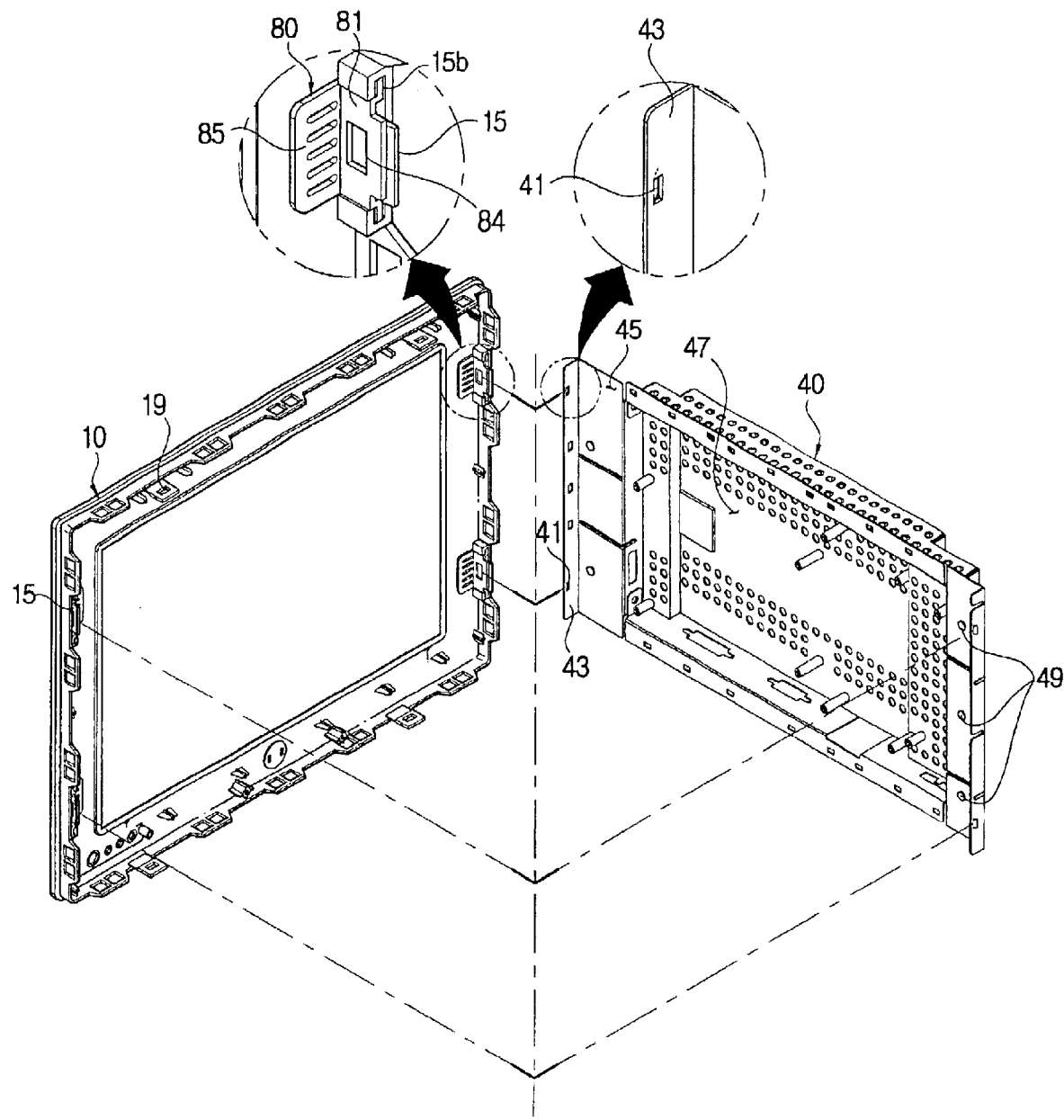
FIG. 5 is an enlarged perspective view illustrating connection parts between a front cover and the panel supporting member of FIG. 4.

As illustrated in FIG. 5, the projection 41 preferably comprises a snap hook manufactured by press-machining the flange part 43 from the inside to the outside, and is detachably engaged with the opening 84 of the reinforcing member 80.

The plurality of second snap pins 17 is arranged along the circumference edge of the front cover 10, each being formed with a projection holder 19 engaged with a projection 21 of the rear cover 20.

Herein, in order to reduce the width "A" of the front 13, it is preferable that the first snap pin 15 and the second snap pin 17 are positioned where the front part 12 and the skirt part 13 meet each other. Also, in the case that the front cover 10 is manufactured by molding, the first and second snap pins 15 and 17 are preferably formed in the inside of the skirt part 13, thereby increasing the stiffness thereof.

Figure 8:
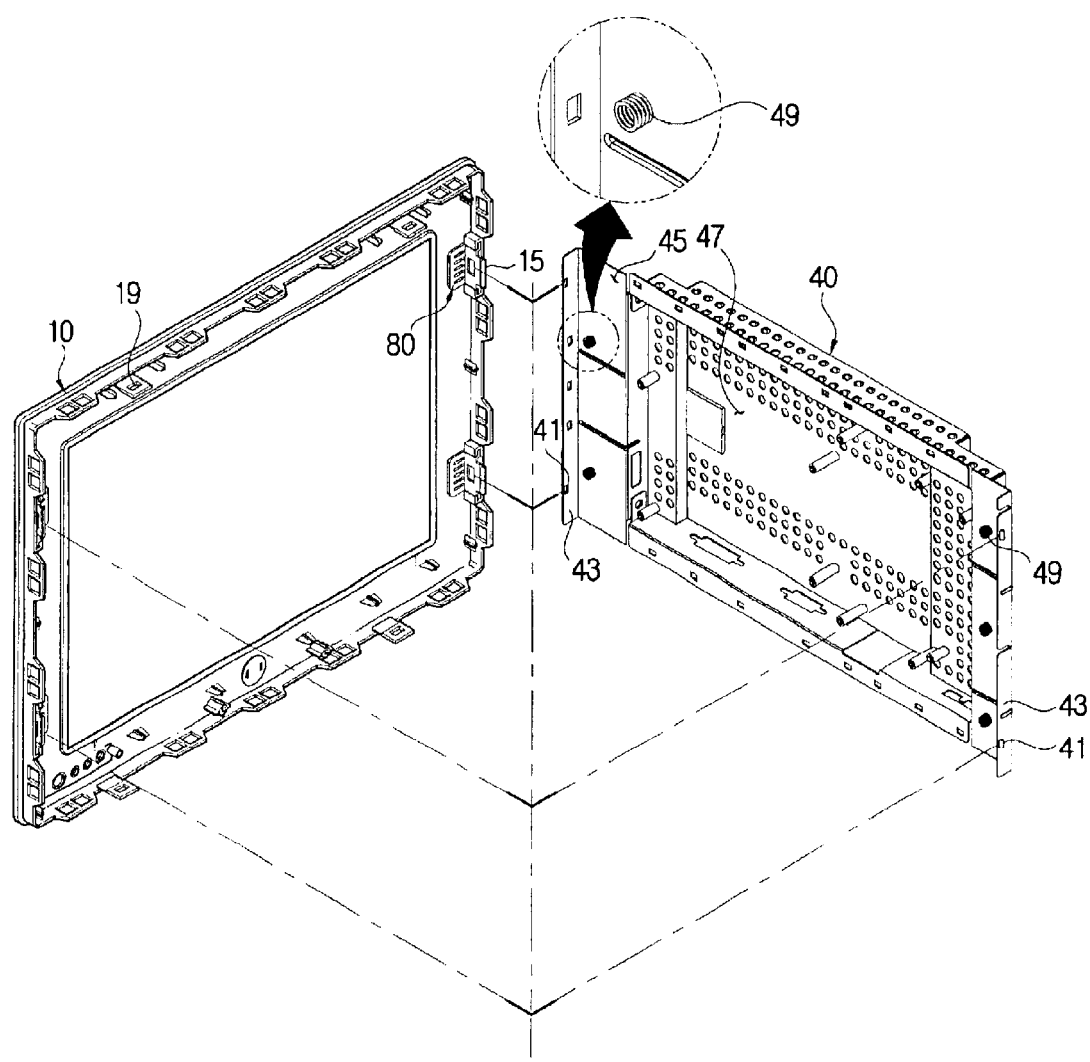
FIG. 8 is an exploded perspective view of a display apparatus according to yet another embodiment of the present invention.

The supporting projection 49 can be manufactured by press-machining the surface of the panel supporting member 40, and has a suitable height depending on the thickness of the LCD panel 30 to support the LCD panel 30. Further, an elastic member such as a spring as illustrated in FIG. 8, can serve as the supporting projection 49.

Figure 6:
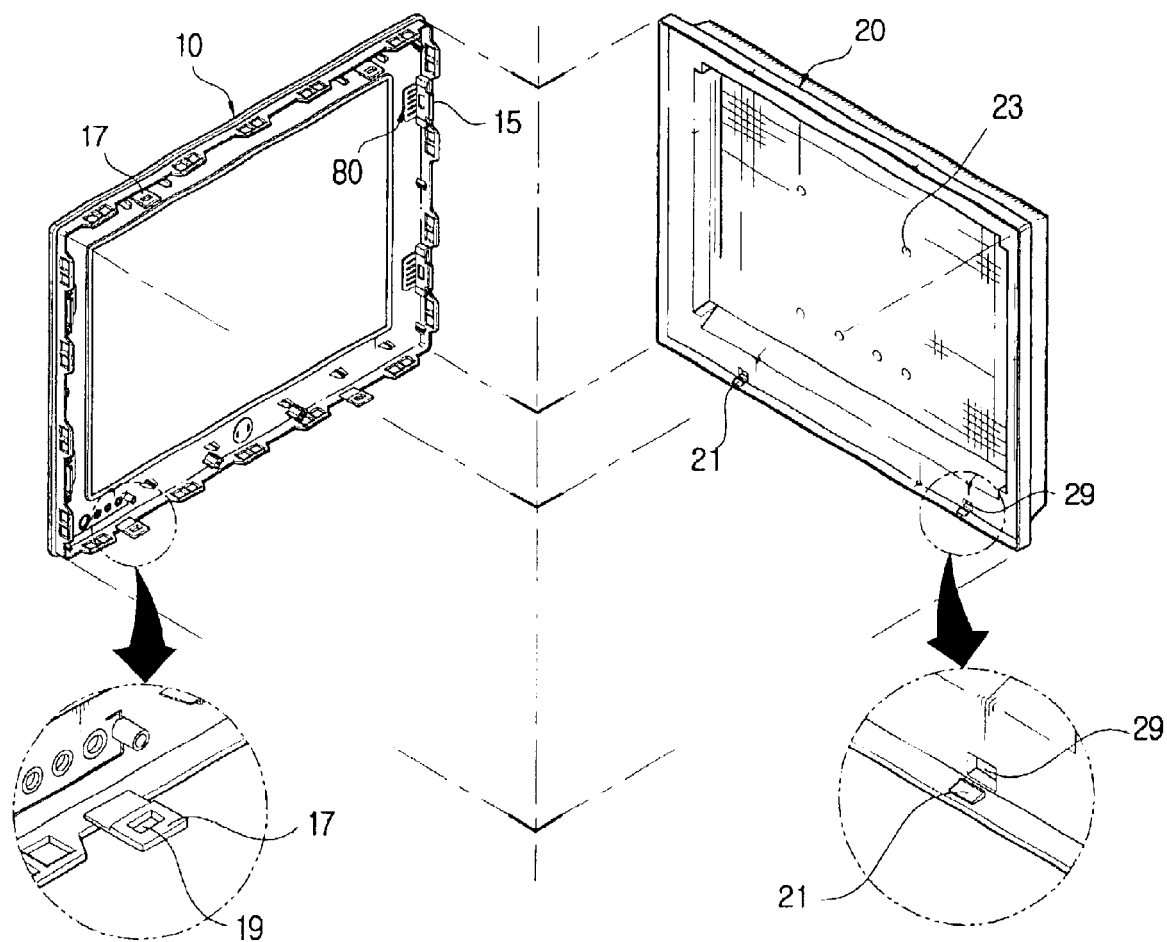
FIG. 6 is an enlarged perspective view illustrating connection parts between the front cover and the rear cover of FIG. 4.

As illustrated in FIG. 6, the rear cover 20, connected to the front cover 10 so as to form an appearance, includes a plurality of air slots 23 provided on the surface of the rear cover 20 and employed to cool the PCB assembly 60, a connector accommodating part (not shown) through which an external device is connected, and the projection 21 provided inside the circumference surface and engaged with the projection holder 19 of the second snap pin 17 of the front cover 10. Herein, the plurality of projections 21 are arranged on the circumference surface of the rear cover 20 in correspondence with the second snap pins 17, and have a wedge shape so as to be easily snapped by the projection holder 19 of the second snap pin 17 when the front cover 10 and the rear cover 20 are connected to each other. Further, the front cover 10 and the rear cover 20, which are connected to each other by the second snap pins 17 and the projections 21, are formed with brims fitted to each other, respectively. On the surface of rear cover 20 adjacent to the projections 21 are formed through holes 29 to release the projections 21 from the second snap pins 17.

Figure 7:
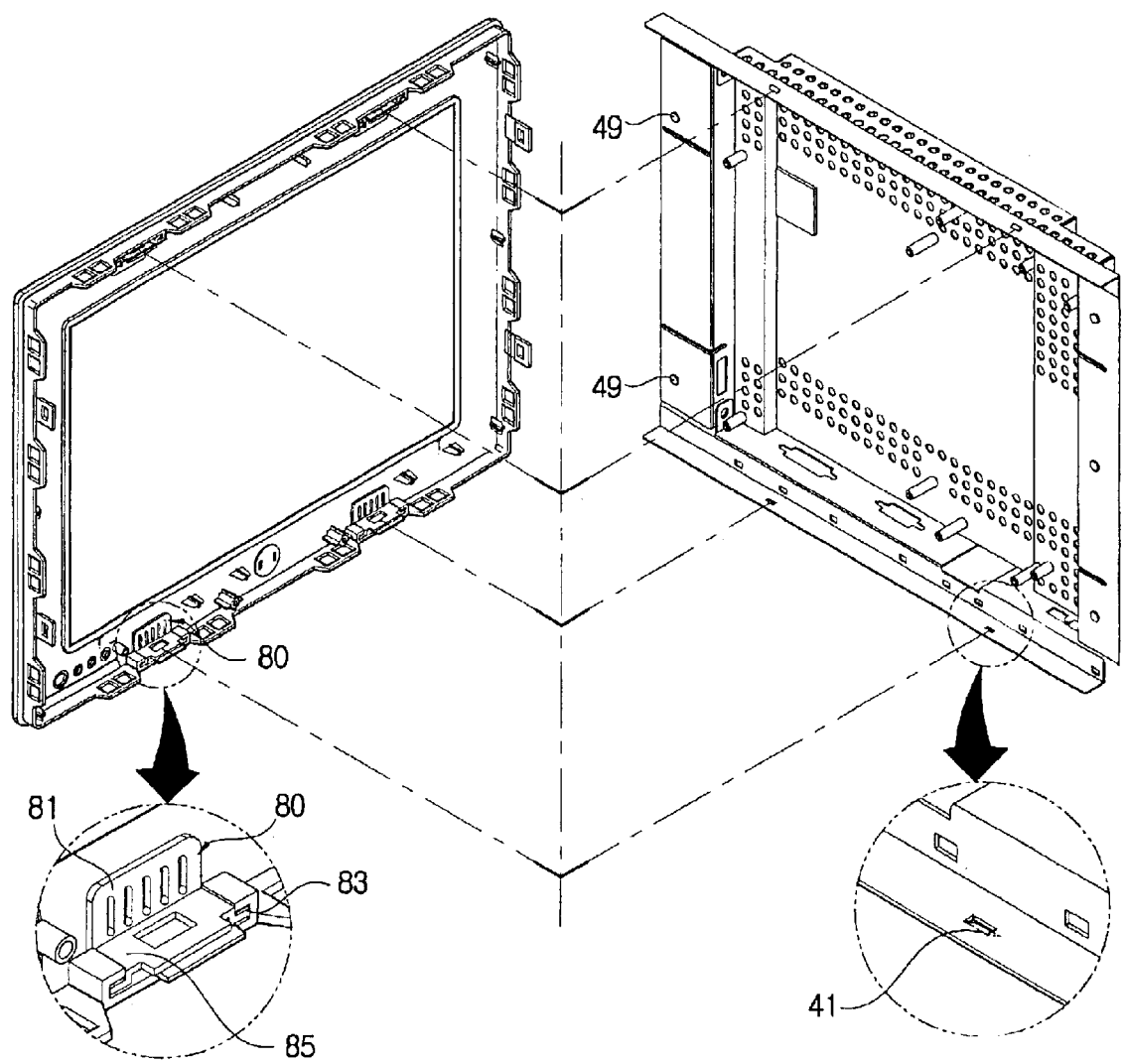
FIG. 7 is an exploded perspective view of a display apparatus according to a another embodiment of the present invention.

Therefore, a long tool such as a screwdriver can be inserted through the release hole 29. On the other hand, as illustrated in FIG. 7, the first snap pins 15 and the second snap pins 17 may be switched in positions thereof. With this configuration, the process of assembling and disassembling of the display apparatus according to the present invention will be described below.

In the case of assembling the display apparatus, first, the PCB assembly 60 is housed in and fastened to the PCB housing 47 of the panel supporting member 40, and then the LCD panel 30 is put in and supported by the panel supporting member 40 in the state that the LCD panel 30 faces toward the front cover 10, and is electrically connected with the PCB assembly 60.

Thereafter, the reinforcing members 80 are connected to the first snap pins 15 of the front cover 10, and then the projections 41 of the panel supporting member 40 mounted with the PCB assembly 60 and the LCD panel 30 are snapped into the openings 84 of the reinforcing members 80 connected to the first snap pins 15 of the front cover 10, thereby completing the combination of the front cover 10 and the panel supporting member 40.

Thereafter, the projections 21 of the rear cover 20 are snapped into the projection holders 19 of the second snap pins 17 provided in the front cover 10, thereby completing the display apparatus according to the present invention.

Oppositely, in the case of disassembling the display apparatus, first, a user inserts a long tool, such as a screwdriver, through each through hole 29 formed on the rear cover 20 and releases each projection 21 from each projection holder 19 of the second snap pin 17, so that the rear cover 20 is detached from the front cover 10. Thereafter, a user pushes the projection 41 of the panel supporting member 40 toward the outside of the skirt part 13 of the front cover 10 to release the projection 41 out of the opening 84 of the reinforcing member 80, so that the panel supporting member 40 is detached from the front cover 10.

As described above, because the panel supporting member 40 accommodates both the LCD panel 30 and the PCB assembly 60, a user can check both the LCD panel 30 and the PCB assembly 60 when the panel supporting member 40 is detached from the front cover 10, thereby facilitating repair of the display apparatus.

As described above, the reinforcing member 80 reinforces the first snap pin 15 and strengthens the front cover 10, thereby improving the durability of the display apparatus. Further, the reinforcing member 80 grounds the panel supporting member 40, thereby shielding electromagnetic waves generated from the PCB assembly 60, i.e., accomplishing the EMI shielding effect. Furthermore, the front cover 10, the panel supporting member 40, and the rear cover 20 are combined without screws, thereby facilitating assembling or disassembling the display apparatus. Moreover, the first and second snap pins 15 and 17 occupy a relatively small space, thereby slimming and compacting the display apparatus.

As described above, the present invention provides a display apparatus which is assembled or disassembled in a relatively short time.

Further, the present invention provides a display apparatus which has a slim and compact appearance.

Further, the present invention provides a display apparatus which has an improved EMI shielding effect, and is improved in durability.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising an LCD panel, a front cover covering a front edge of the LCD panel, a panel supporting member connected to the front cover, with the LCD panel being disposed therebetween, and a rear cover disposed in back of the panel supporting member and connected to the front cover, the display apparatus further comprising:
   a first snap pin protruding from the rear of the front cover and having a first projection holder;
   a reinforcing member formed with an opening and having a projection engaging with the first projection holder of the first snap pin; and
   a flange part formed on the panel supporting member and having a first projection engaging with the opening of the reinforcing member.

2. The display apparatus according to claim 1, wherein the reinforcing member is made of a conductive material.

3. The display apparatus according to claim 1, wherein the reinforcing member includes:
   a ground part having a first surface in contact with the rear surface of the front cover and a second surface in contact with the panel supporting member;
   a reinforcing part bent from the ground part and extending parallel with the first snap pin; and a rib formed at opposite sides of the reinforcing part, wherein the projection and the opening of the reinforcing member are provided in the reinforcing part, respectively.

4. The display apparatus according to claim 3, wherein the first snap pin includes a rib holder engaging with the rib of the reinforcing member so as to prevent the reinforcing member from breaking away.

5. The display apparatus according to claim 1, wherein the first projection of the flange part comprises a snap hook manufactured by pressmachining the flange part.

6. The display apparatus according to claim 1, wherein the panel supporting member includes a supporting projection supporting the LCD panel.

7. The display apparatus according to claim 1, wherein the panel supporting member is formed with a predetermined housing accommodating a PCB assembly communicating an electric signal with the LCD panel.

8. The display apparatus according to claim 1, further comprising:

a second snap pin protruding from the rear of the front cover at a distance from the first snap pin and having a second projection holder; and a second projection formed on the rear cover and engaging with the second projection holder of the second snap pin.

9. A display apparatus having a front cover and a rear cover enclosing an LCD panel and a printed circuit board, comprising:

a panel supporting member connected to the front cover such that the LCD panel is held therebetween;

a plurality of first snap pins provided on the rear of the front panel and protruding therefrom toward the panel supporting member to engage with the panel supporting member;

a plurality of second snap pins provided on the rear of the front cover and protruding therefrom toward the rear cover to engage with the rear cover;

a plurality of reinforcing members each having a projection and a rib;

a projection holder provided on each of the first snap pins and engaging with one of said respective projections; and a plurality of rib holders provided adjacent to opposite sides of each first snap pin and engaging with one of the respective ribs.

10. The display apparatus according to claim 9, wherein each of the plurality of reinforcing members further comprises:

a ground part contacting the front cover;

a reinforcing part bent from the ground part and extending parallel to one of the respective first snap pins; and an opening formed in the reinforcing part, wherein the ribs extend from opposite sides of the reinforcing parts and engage with a respective one of the plurality of rib holders.

11. The display apparatus according to claim 10, wherein each of the reinforcing parts include a projection to be inserted into one of the projection holders to provide reinforcement between the reinforcing member and the respective first snap pin.

12. The display apparatus according to claim 11, wherein the reinforcing part is made from a conductive material to ground the panel supporting member to shield electromagnetic waves generated by the printed circuit board.

13. The display apparatus according to claim 10, wherein the ground part comprises:

a first surface contacting the inside of the front cover; and a second surface contacting the panel supporting member, wherein the ground part shields electromagnetic waves generated by the printed circuit board.

14. The display apparatus according to claim 10, wherein the panel supporting member comprises:

a flange part forwardly bent therefrom; and a projection formed in the flange part to engage with one of the respective openings of the reinforcing members.

15. The display apparatus according to claim 14, wherein the panel supporting member further comprises a supporting projection on the Inside surface thereof and facing toward the LCD panel to closely support the LCD panel.

16. The display apparatus according to claim 14, wherein the projection formed In the flange part comprises a snap hook to detachably engage with the one of the respective openings of the reinforcing member.

17. The display apparatus according to claim 15, wherein the supporting projection is formed of an elastic spring.

* * * * *

UNITED STATES PATENT AND TRADEMARK OFFICE
CERTIFICATE OF CORRECTION

PATENT NO. : 6,894,739 B2 Page 1 of 1
DATED : May 17, 2005
INVENTOR(S) : Ki-hyub Sung It is certified that error appears in the above-identified patent and that said Letters Patent is hereby corrected as shown below:

Column 8,
Line 34, change "Inside" to -- inside --.
Line 37, change "In" to -- in --.

Signed and Sealed this

Twenty-eighth Day of March, 2006

JON W. DUDAS
*Director of the United States Patent and Trademark Office*